(12) United States Patent
Moneymaker

(10) Patent No.: US 7,447,303 B1
(45) Date of Patent: *Nov. 4, 2008

(54) SYSTEM FOR VALIDATING PHONE NUMBERS TO PREVENT AFFILIATE FRAUD

(76) Inventor: Michael Moneymaker, 5302 Caminito Vista Lujo, San Diego, CA (US) 92130

( * ) Notice: Subject to any disclaimer, the term of this patent is extended or adjusted under 35 U.S.C. 154(b) by 0 days.

This patent is subject to a terminal disclaimer.

(21) Appl. No.: 11/840,919

(22) Filed: Aug. 17, 2007

(51) Int. Cl.
*H04M 3/42* (2006.01)
(52) U.S. Cl. .............................. 379/207.13; 379/207.14
(58) Field of Classification Search ................................
379/207.13–207.15, 201.01; 713/202; 709/219
See application file for complete search history.

(56) References Cited

U.S. PATENT DOCUMENTS

| | | | |
|---|---|---|---|
| 5,388,148 | A | 2/1995 | Seiderman |
| 5,465,291 | A | 11/1995 | Barrus et al. |
| 5,700,149 | A | 12/1997 | Johnson, III et al. |
| 6,968,177 | B2 * | 11/2005 | Miller et al. .................. 455/411 |
| 2001/0054019 | A1 | 12/2001 | de Fabrega |
| 2003/0005136 | A1 * | 1/2003 | Eun ............................ 709/229 |
| 2004/0030935 | A1 * | 2/2004 | Kai ............................... 713/202 |
| 2004/0202293 | A1 | 10/2004 | Pugliese |
| 2005/0166061 | A1 * | 7/2005 | Brookner et al. ............ 713/184 |
| 2005/0283443 | A1 | 12/2005 | Hardt |
| 2006/0136294 | A1 * | 6/2006 | Linden et al. .................. 705/14 |
| 2006/0265493 | A1 * | 11/2006 | Brindley et al. ............. 709/224 |
| 2007/0074169 | A1 * | 3/2007 | Chess et al. .................. 717/126 |
| 2007/0094355 | A1 * | 4/2007 | Mulakala et al. ............ 709/219 |
| 2007/0190976 | A1 * | 8/2007 | Hoshino et al. ............. 455/411 |
| 2007/0199053 | A1 * | 8/2007 | Sandhu et al. .................. 726/4 |

* cited by examiner

*Primary Examiner*—William J Deane
(74) *Attorney, Agent, or Firm*—Eric Karich

(57) ABSTRACT

A fraud prevention system has a customer sign-up program accessible via a computer network that functions to receive an inquiry from a customer. A phone number database enables confirmation of a phone number provided by the customer. A validation program generates a validation page having a text receiving box adapted for receiving an inputted PIN, calls the phone number to establish phone communication with the customer via a phone service, provides a PIN via the phone service, receives an inputted PIN via the validation page, and confirms that the inputted PIN matches the PIN provided via the phone service. Finally, the validation program updates the phone number database so that the phone number is no longer valid, and provides credit to the affiliate for referring the customer.

3 Claims, 4 Drawing Sheets

40 http://psbaonline.com

PSBA Get the Purchasing Power You need
Platinum Small Business Alliance

TERMS  ABOUT US  FAQ'S  CONTACT US

Small Business Owner? Self Employed?

*Now, you can get up to...*

$8,000 00    Guaranteed Credit

→ Guaranteed a Cash Advance of up to $150,000 for PSBA Merchants!

[ JOIN NOW ]

ATTENTION:
Individuals, Self-Employed, Small Business Owners & Entrepreneurs!

*EVERYONE GETS ACCEPTED!*

→ No prior business credit needed
→ $1000's in savings on goods and services you use everyday!
→ No credit checks to join!**

also...

PSBA Members have an opportunity to apply for our Platinum Visa Card with up to $10,000 in credit!

Join Now for Instant Activation!
Primary Account Holder Information

42

First Name: [Jane]         Last Name: [Doe]
Address: [123 Happy St.]   City: [Costa Mesa]
State: [California]        Zip: [92626]
Email: [jane@doe.com]      Phone: [714]-[555]-[1234]
                            44        46

* Your phone number will be called to validate your identify, so be sure to use a number you can answer.

[ Submit Information ]  48

If you have difficulties registering click here

*Fig. 2*

SYSTEM FOR VALIDATING PHONE NUMBERS TO PREVENT AFFILIATE FRAUD

CROSS-REFERENCE TO RELATED APPLICATION

Not Applicable

STATEMENT REGARDING FEDERALLY SPONSORED RESEARCH

Not Applicable

BACKGROUND OF THE INVENTION

1. Field of the Invention

This invention relates generally to fraud prevention systems, and more particularly to a fraud prevention system that validates phone numbers to prevent affiliate fraud.

2. Description of the Related Art

Many web sites utilize marketing systems that rely on affiliate web sites referring customers to the web site. In exchange for the referral, the owner of the web site pays the affiliate a referral fee. Affiliate fraud consists of referring false "customers" and generating unearned referral fees.

The prior art includes many systems and methods for preventing various forms of fraud, including the following:

Hardt, U.S. 2005/0283443, teaches a secure system for secure management of identify information. Systems for identity management, such as Microsoft's PASSPORT, require exceptional security due to the confidentiality of the information contained therein. The Hardt system validates access to the system by calling a designated number and requiring entry of a PIN memorized by the user. The system does not disclose the use of a validation number provided on a computer screen for verification in response to the validation call.

Pugliese, U.S. 2004/0202293, teaches an automatic calling system which analyzes the contents of detected voice on a called line and controls the operation of the calling system dependent upon the analyzed context. For example, the system determines whether a person is answering the phone, or an answering machine, or whether a computer system is prompting entry of an extension. Upon answer detection, the called party is played one or more messages, and action is taken dependent upon analyzed responses from the called line. It is specifically noted that such a call-back system could be used for verification purposes. The system does not disclose the use of a validation number for verification in response to the validation call.

De Fabrega, U.S. 2001/0054019, teaches an e-commerce development intranet portal having a multiple-carrel public-access kiosk. The intranet provides free access to e-commerce intranet sites as well as e-mail and public service educational and informational materials. The kiosk accepts anonymous pre-paid cards issued by a local franchisee of a network of e-commerce intranets that includes the local intranet. The portal receives a cell phone number from a new user during the set-up process, and the system automatically calls this number to receive confidential information such as credit card numbers, PINS, etc.

Johnson, III et al., U.S. Pat. No. 5,700,149, teaches a personal verification system for administering a course of study using a central data processor. The system checks incoming calls to confirm that they are coming from an approved number, and then calls the home number associated with that student to verify that it was the student using the system.

Other systems of general interest include Seiderman, U.S. Pat. No. 5,388,148, and Barrus et al., U.S. Pat. No. 5,465,291. The above-described references are hereby incorporated by reference in full.

The prior art teaches various fraud prevention systems that include the use of PIN numbers and/or phone verification. However, the prior art does not teach a fraud prevention system for preventing affiliate fraud that includes the system disclosed in the present invention, as described and claimed below. The present invention fulfills these needs and provides further related advantages as described in the following summary.

SUMMARY OF THE INVENTION

The present invention teaches certain benefits in construction and use which give rise to the objectives described below.

The present invention provides a fraud prevention system for preventing affiliate fraud in the referral of a customer by an affiliate via a computer network. The fraud prevention system includes a customer sign-up program accessible via the computer network that functions to receive an inquiry from the customer, including a phone number. A validation program confirms that the phone number is valid by referencing the phone number database, generates a validation page having a text receiving box adapted for receiving an inputted PIN, calls the phone number to establish phone communication with the customer via a phone service, provides a PIN via the phone service, receives an inputted PIN via the validation page, confirms that the inputted PIN matches the PIN provided via the phone service, updates the phone number database so that the phone number is no longer valid, and provides credit to the affiliate for referring the customer.

A primary objective of the present invention is to provide a fraud prevention system having advantages not taught by the prior art.

Another objective is to provide a fraud prevention system that uses a phone service to call a phone number associated with a customer, provides a PIN via the phone service, and receives an inputted PIN via a validation page of the fraud prevention system to verify that the customer is legitimate.

A further objective is to provide a fraud prevention system that prevents affiliate fraud without significantly interfering with the customer's navigation of the web site.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 2 is a view of a screen display of a customer sign-up page;

DETAILED DESCRIPTION OF THE INVENTION

The above-described drawing figures illustrate the invention, a fraud prevention system 10 for preventing affiliate 14 fraud in the referral of a customer 12 by an affiliate 14 via a computer network 16.

Figure 1:
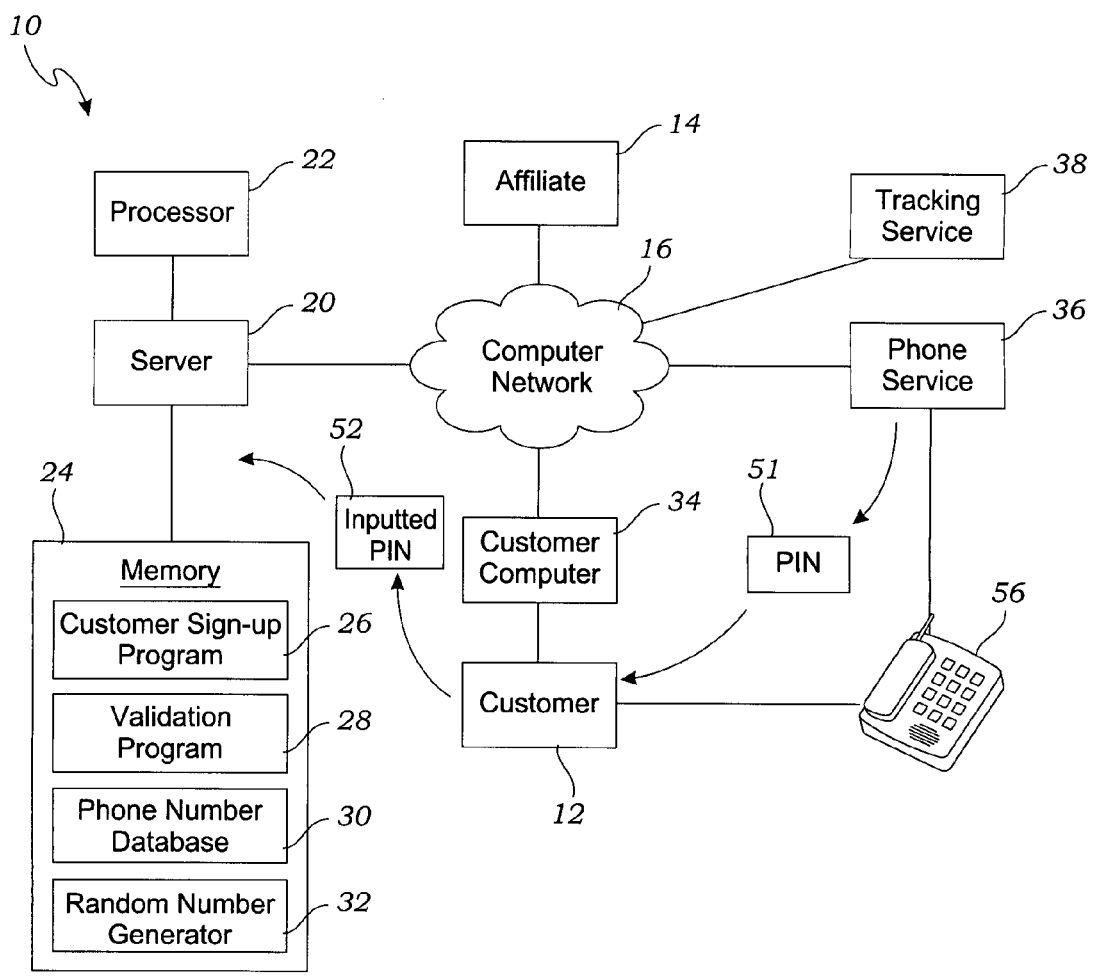
FIG. 1 is a block diagram of a fraud prevention system for preventing affiliate fraud.

FIG. 1 is a block diagram of one embodiment of the fraud prevention system 10. As shown in FIG. 1, the fraud prevention system 10 preferably includes a server 20 having a processor 22 and a memory 24. The server 20 is adapted to be operably attached to the computer network 16 so that it may be operably accessed by the customer 12. While the server 20 may be a standard computer platform with standard construction known to those skilled in the art, the terms server 20, processor 22, and memory 24 are hereby expressly defined to include any arrangement of computer(s) and/or electronics devices operably attached to the computer network 16 and/or distributed throughout the computer network 16 on a variety of computers or computer components, memory 24 devices, etc.

The fraud prevention system 10 includes a customer sign-up program 26, a validation program 28, and a phone number database 30 of valid phone numbers that may only be used once and are then designated as invalid. The programs 26 and 28 and the database 30 are preferably stored in the memory 24 of the server 20, and are described in greater detail below; however, they may also be stored in alternative locations, as is well known in the art. The server 20 preferably also includes a random number generator 32 for generating a random number. Such generators are well known in the art, so the generator 32 is not described in greater detail herein.

As shown in FIG. 1, the computer network 16, such as the Internet®, functions to operably connect the affiliate 14, a customer computer 34, and the server 20. The computer network 16 may also interconnect the server 20 with a phone service 36 and a tracking service 38, as described in greater detail below. In function, the affiliate 14, typically a web site that is designed to attract the customer 12, refers the customer 12 to the server 20 to receive an offer of some goods and/or services. This referral may be tracked by the tracking service 38, which may or may not be independent of the server 20. The fraud prevention system 10 functions to verify that such referrals are actually of legitimate potential customers 12, and not just dummy referrals designed to run up fraudulent referral fees.

FIG. 2 is a view of a screen display of a customer sign-up page 40. The customer sign-up page 40 is generated by the customer sign-up program 26 in response to an inquiry from the customer computer 34. The customer sign-up page 40 includes a plurality of fields 42, such as name, address, email, for receiving sign-up information from the customer 12. The sign-up information includes a phone number field 44 for receiving a phone number 46. The data collected via the customer sign-up page 40 will vary program by program, and the present customer sign-up page 40 is for illustrative purposes of one embodiment of the customer sign-up page 40.

Once the customer 12 clicks upon a "submit information" button 48, or similar trigger, the data from the customer sign-up page 40 is transferred to the customer sign-up program 26 on the server 20.

Once the customer sign-up program 26 has received the data from the customer 12, the validation program 28 confirms that the phone number 46 is valid by referencing the phone number database 30. The phone number database 30 could include a list of all valid phone numbers 46, or it could initially be empty, and then filled with invalid phone numbers 46. If the phone number database 30 includes a list of all valid phone numbers 46, then the validation program 28 functions to confirm that the phone number 46 received from the customer 12 is in the phone number database 30. If the phone number database 30 includes a list of invalid phone numbers 46, then the program would function to confirm that the phone number 46 received from the customer 12 was not in the phone number database 30.

If the phone number 46 is invalid, then the referral fee to the affiliate 14 is denied, although the validation program 28 may generate an error screen (not shown) to give the customer 12 a chance to input another number.

Figure 3:
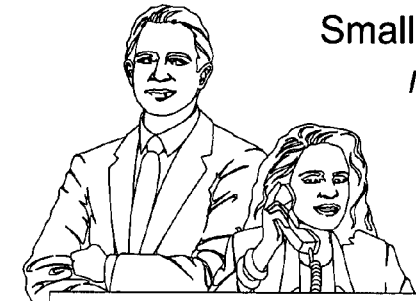
FIG. 3 is a view of a screen display of the customer sign-up page along with a validation page having a text receiving box for receiving an inputted PIN.

If the phone number 46 is valid, then the validation program 28 generates a validation page 50. FIG. 3 is a view of a screen display of one embodiment of the validation page 50 displayed on top of the customer sign-up page 40. The validation page 50 includes text receiving box 54. The validation program 28 also functions to call the phone number 46 via the phone system 36 to establish phone communication with the customer 12. The server 20 may automatically establish a connection with the phone service 36, either directly or via the computer network 16, and connect with a customer phone 56. The customer phone 56 may be a land-line, a cell phone, or any other similar or equivalent form of communication.

A PIN 51 is generated by the server 20, preferably with the random number generator 32 (illustrated in FIG. 1). While a short alphanumeric code is preferably used as the PIN 51, any form of unique identification may also be used, as long as the identification functions to perform the task described herein. Once the connection is made with the customer phone 56 (illustrated in FIG. 1), the server 20 provides the PIN 51 to the customer 12.

Once the customer 12 receives the PIN 51, he or she inputs an inputted PIN 52 into the text receiving box 54. The inputted PIN 52 may be typed in using the keypad of the customer phone 56, or verbally spoken into the customer phone 56 (if suitable voice recognition software is provided), or otherwise operably inputted. The validation program 28 then confirms that the inputted PIN 52 matches the PIN 51 provided via the phone service 36, update the phone number database 30 so that the phone number 46 is no longer valid, and finally to provide credit to the affiliate 14 for referring the customer 12. The credit provided to the affiliate 14 may be tracked by the server 20, and/or reported to the tracking service 38 (shown in FIG. 1) that tracks affiliate 14 referrals from the affiliate 14 to the server 20.

Figure 4:
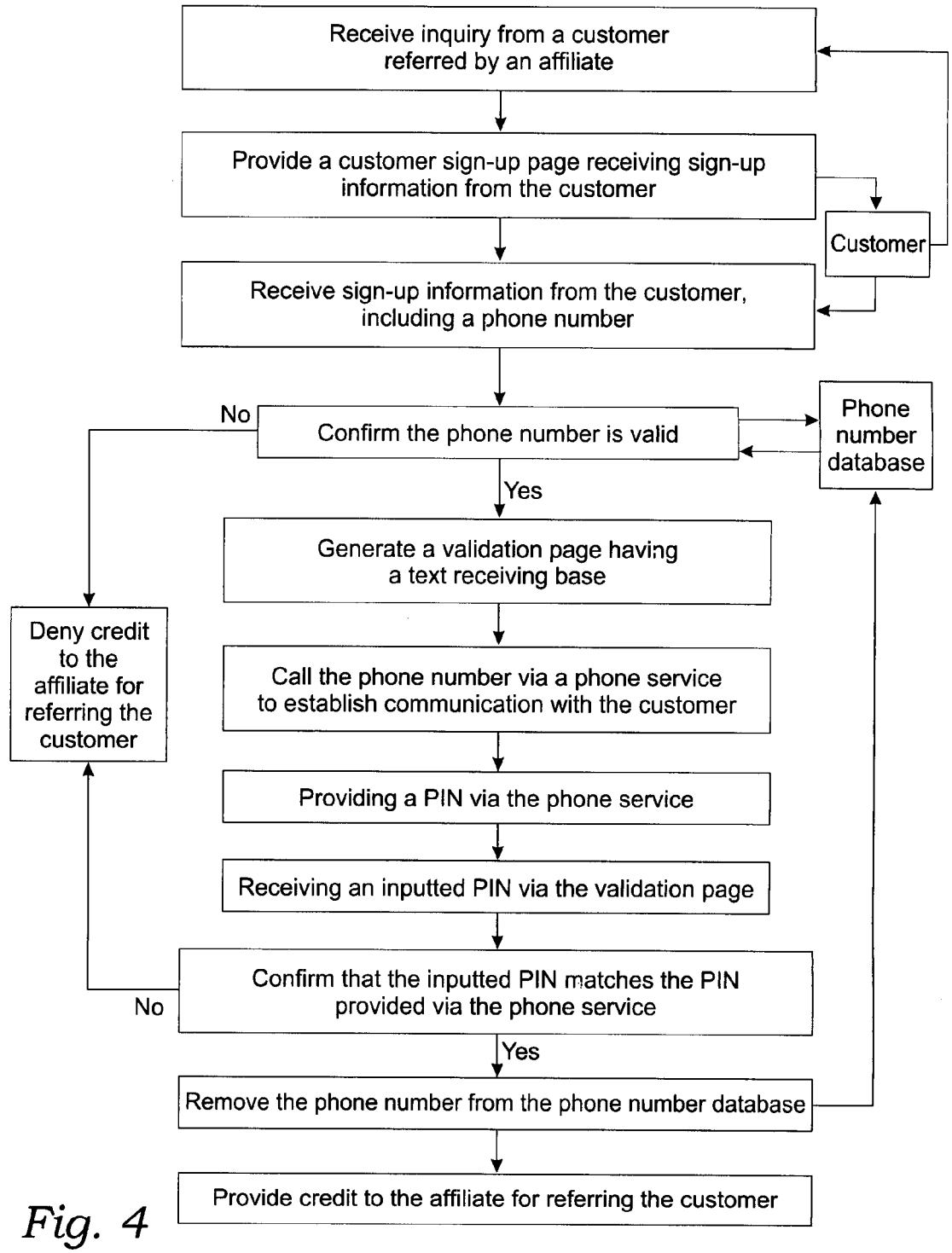
FIG. 4 is a flow diagram illustrating a method of using the fraud prevention system to prevent affiliate fraud.

FIG. 4 is a flow diagram illustrating a method of using the fraud prevention system 10 to prevent affiliate 14 fraud. When the fraud prevention system 10 receives an inquiry from the customer 12 referred by the affiliate 14, it provides the customer sign-up page 40 for receiving the sign-up information from the customer 12. The sign-up information includes the phone number 46 (unless the phone number 46 is only directly inputted into the validation program 28). Once the customer 12 fills out the customer sign up page 40, as shown in FIG. 2, the information is submitted and the server 20 (shown in FIG. 1) receives the sign-up information from the customer 12, including the phone number 46.

Obviously, when dealing with computer programs, many of the specific functions of the programs may be varied without altering the substance of the program. For example, the phone number 46 may be inputted as part of the customer sign-up program 26, and merely referenced by the validation program 28; or in the alternative, the phone number 46 might be inputted directly into the validation screen generated by the validation program 28. The validation program 28 could then proceed to validate the phone number 46 whenever it is inputted and/or amended. The terminology of the present invention is hereby expressly defined to include such alternative arrangements, and other non-substantive changes to the performance of the fraud prevention system 10, and such alternatives should be considered within the scope of the present invention.

Once the phone number 46 has been inputted and received by the server 20, the fraud prevention system 10 then confirms that the phone number 46 is valid by referencing the phone number database 30. The phone number database 30 enables the system 10 to track the phone numbers used, so that each number may only be used once, then that number is designated as invalid so that the same number may not be used a second time. If the phone number 46 is valid, the validation page 50 is generated and either includes the PIN 51, or a method for receiving the PIN 51 selected by the customer 12. The phone number 46 is called to establish communication with the customer 12, who then inputs the inputted PIN 52. The inputted PIN 52 is then compared to the PIN 51 of the validation page 50, and if they match, the affiliate 14 is provided credit for the referral. The phone number database 30 is updated so that the phone number 46 is no longer valid. This prevents the same phone number 46 from being used repeatedly.

Those committing affiliate 14 fraud may be able to falsify a small number of referrals by setting up dummy accounts, but the number would be limited to the number of phone numbers 46 they were able to access. Since it is not practical to control a large number of phone numbers 46 without inordinate expense, affiliate 14 fraud is avoided on any meaningful scale.

The terminology used herein is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless stated otherwise. While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A fraud prevention system for preventing affiliate fraud in the referral of a customer by an affiliate via a computer network, the fraud prevention system comprising:
    a customer sign-up program on a computer readable memory accessible via the computer network and functioning to receive an inquiry from the customer that includes a phone number;
    a phone number database on the computer readable memory of valid phone numbers that may only be used once and are then designated as invalid; and
    a validation program on the computer readable memory functioning to perform the following steps:
        confirming that the phone number is valid by referencing the phone number database;
        generating a validation page having a text receiving box adapted for receiving an inputted PIN;
        calling the phone number to establish phone communication with the customer via a phone service;
        providing a PIN via the phone service;
        receiving an inputted PIN via the validation page;
        confirming that the inputted PIN matches the PIN provided via the phone service;
        updating the phone number database so that the phone number is no longer valid; and
        providing credit to the affiliate for referring the customer.

2. A fraud prevention system for preventing affiliate fraud in the referral of a customer by an affiliate via a computer network, the fraud prevention system comprising:
    a customer sign-up program on a computer readable memory accessible via the computer network and functioning to perform the following steps:
        receiving an inquiry from the customer;
        providing a customer sign-up page for receiving sign-up information from the customer, the sign-up information including a phone number; and
        receiving the sign-up information from the customer, including the phone number;
    a phone number database on the computer readable memory of valid phone numbers that may only be used once and are then designated as invalid; and
    a validation program on the computer readable memory functioning to perform the following steps:
        confirming that the phone number is valid by referencing the phone number database;
        generating a validation page having a text receiving box for receiving an inputted PIN,
        calling the phone number to establish phone communication with the customer via a phone service;
        providing a PIN via the phone service;
        receiving an inputted PIN via the validation-page;
        confirming that the inputted PIN matches the PIN provided by the phone service;
        updating the phone number database so that the phone number is no longer valid; and
        providing credit to the affiliate for referring the customer.

3. A method for preventing affiliate fraud, the method comprising the steps of:
    receiving an inquiry from a customer referred by an affiliate;
    receiving a phone number from the customer;
    confirming that the phone number is valid by referencing a phone number database;
    generating a validation page having a text receiving box;
    calling the phone number to establish phone communication with the customer;
    providing a PIN via the phone communication;
    receiving an inputted PIN via the validation page;
    confirming that the inputted PIN matches the PIN;
    updating the phone number database so that the phone number is no longer valid; and
    providing credit to the affiliate for referring the customer.

* * * * *